March 28, 1967 — E. P. LAKITSKY — 3,311,329
FLEXIBLE TRACK SECTION FOR EXPANSION JOINT
Filed Dec. 16, 1965 — 2 Sheets-Sheet 1

*INVENTOR*
EDWARD P. LAKITSKY

*H. H. Losche*
*Paul S. Collignon*
ATT'YS

March 28, 1967 E. P. LAKITSKY 3,311,329
FLEXIBLE TRACK SECTION FOR EXPANSION JOINT
Filed Dec. 16, 1965 2 Sheets-Sheet 2

INVENTOR
EDWARD P. LAKITSKY
ATT'YS 3,311,329
FLEXIBLE TRACK SECTION FOR
EXPANSION JOINT
Edward P. Lakitsky, Brookhaven, Pa., assignor to the
United States of America as represented by the Secretary of the Navy
Filed Dec. 16, 1965, Ser. No. 514,412
4 Claims. (Cl. 244—114)

The invention described herein may be manufactured and used by or for the Government of the United States of America for governmental purposes without the payment of any royalties thereon or therefor.

The present invention relates to a flexible track section for providing guidance to a slidable member, and more particularly to a flexible track section for spanning an expansion joint on an aircraft carrier.

Aircraft carriers are provided with one or more catapults that provide additional acceleration for airplanes that are launched from the carrier. The catapults are provided with a bridle that engages with launching hooks on an airplane to be launched, and a bridle arrester is provided to de-accelerate the bridle after the airplane is launched. A pair of arrester shuttles are provided to which the bridle is attached, and these arrester shuttles are slidable in tracks that are attached to the carrier deck. As the tracks extend a considerable length of the carrier deck, they span one or more expansion joints on the carrier deck and it is necessary that these tracks be expansible.

Heretofore, an expansion track section was provided on an aircraft carrier deck that spanned an expansion joint, and this expansion track section was attached to first and second fixed track sections by means of dowel pins that permitted relative movement in a longitudinal direction only. As a result, when the carrier's hull flexed in rough seas, either the bolts or the dowel pins in the expansion track section failed.

The present invention provides an improved flexible track section for an aircraft carrier than can move in any direction when the carrier hull is being flexed by rough seas. A platform assembly is provided, and the bridle arrester tracks are bolted to the top side of the platform assembly. A pair of ball joints are provided to support the platform assembly and these ball joints permit the platform to move in any desired direction.

It is therefore a general object of the present invention to provide an improved flexible track section on an aircraft carrier for guiding a bridle arrester shuttle.

Another object of the present invention is to provide a flexible track section that is pivoted in any direction.

Other objects and advantages of the present invention will be readily appreciated as the same becomes better understood by reference to the following detailed description when considered in connection with the accompanying drawings wherein.

Figure 1:
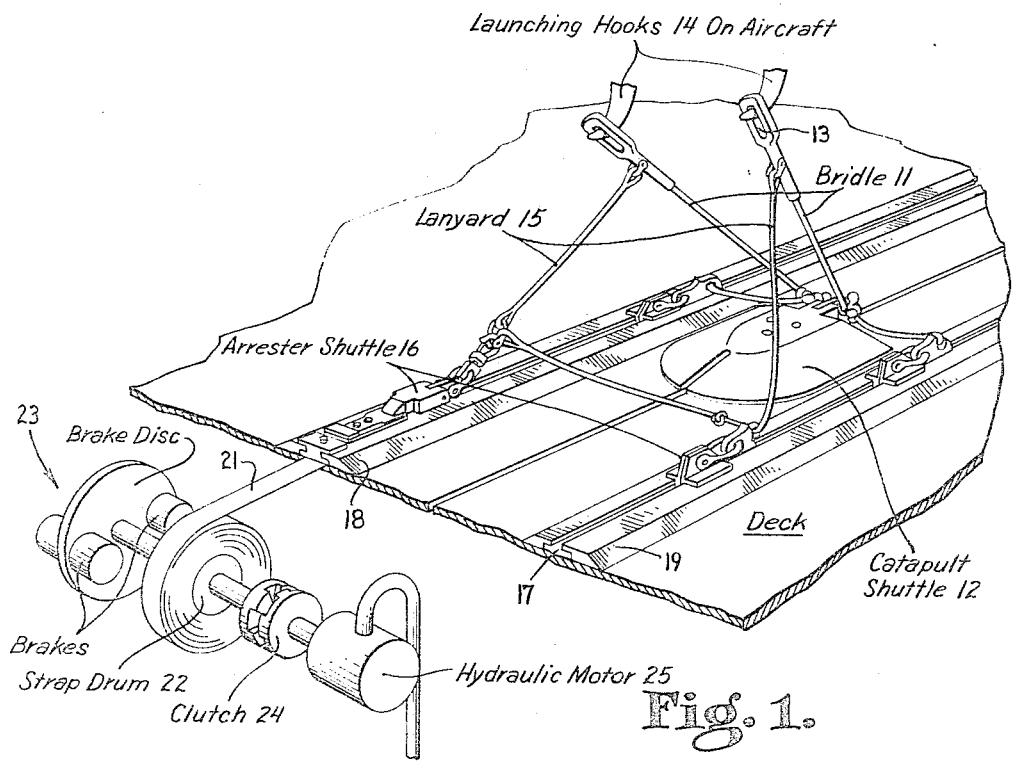
FIGURE 1 is a diagrammatic view of a bridle arrester on the deck of an aircraft carrier.
Figure 4:
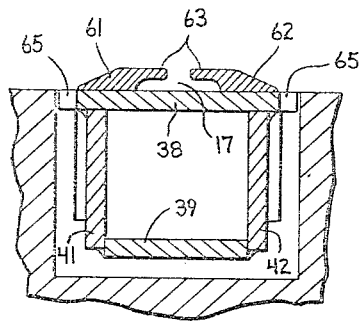
FIGURE 4 is a sectional view taken on line 4—4 of FIGURE 3.
Figure 5:
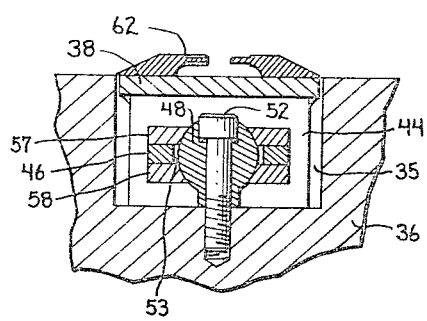
FIGURE 5 is a sectional view taken on line 5—5 of FIGURE 2.
Figure 2:
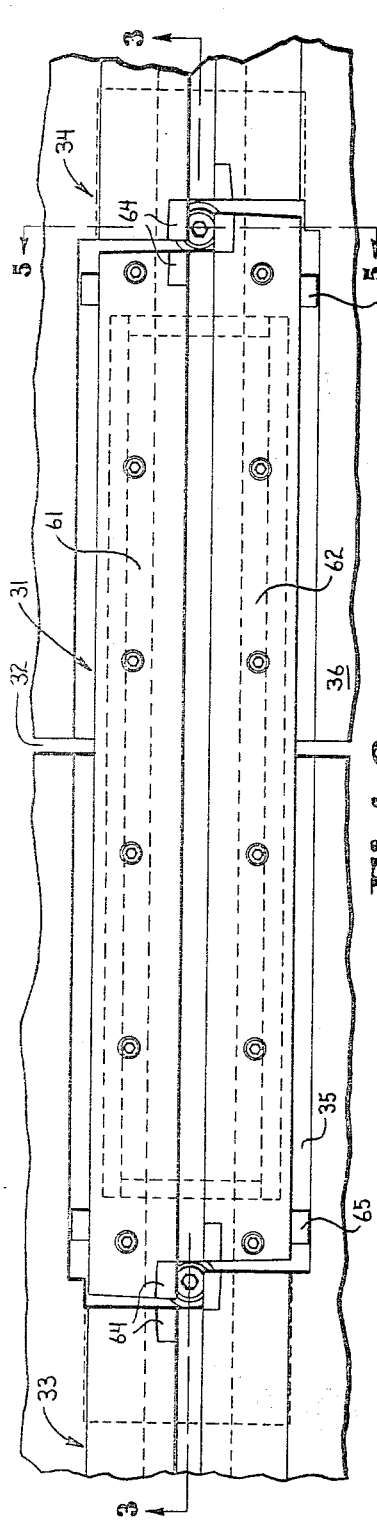
FIGURE 2 is a top plan view of a flexible track section.
Figure 3:
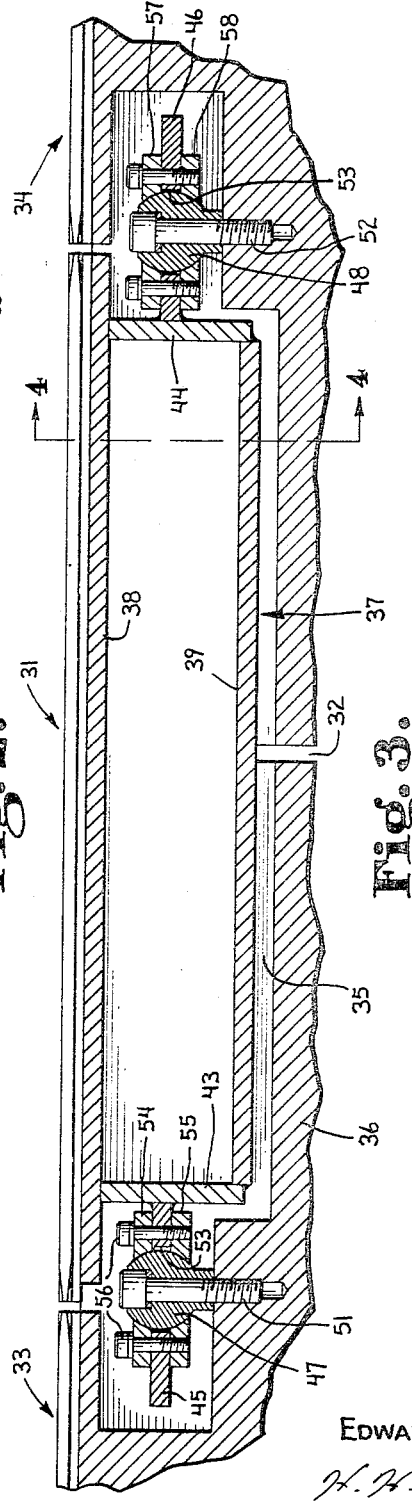
FIGURE 3 is a sectional view taken on line 3—3 of FIGURE 2.

Referring now to the drawings, FIGURE 1 illustrates an arrester device for stopping the bridle of a catapult. The birdle 11 is attached to the catapult shuttle 12 and the bridle has slots 13 that engage the launching hooks 14 on an aircraft. Lanyards 15 have one end connected to bridle 11 and the other ends are connected to arrester shuttles 16 that travel in slots 17 in tracks 18 and 19. A strap 21 has one end attached to one arrester shuttle 16 and the other end of strap 21 is wound upon a strap drum 22. A braking device 23 is provided to brake the arrester shuttles 16, and a clutch 24 and motor 25 are provided to rewind strap 21 on drum 22. As tracks 18 and 19 span an expansion joint in the deck, it is necessary that a flexible section be provided in each track so that the tracks can flex when the ship's hull is flexed.

Referring now to FIGURES 2 through 5 of the drawings, there is shown a flexible track section 31 that bridges an expansion joint 32 and which connects permanent track sections 33 and 34. Each catapult on an aircraft carrier would be provided with an identical pair of flexible track sections 31 for each expansion joint 32 as there are two arrester shuttles 16 for each catapult and each shuttle 16 slides in its own track. For purpose of illustration, FIGURE 1 of the drawings does not show a flexible track section, however, it should be understood that track sections 18 and 19 would each be comprised of at least one flexible track section 31 and at least two permanent track sections 33 and 34.

A well 35 is provided in the deck 36 of an aircraft carrier at the expansion joint 32, and a platform 37 is provided in well 35 to bridge the expansion joint. By way of example, platform 37 might be of welded construction and be comprised of a top plate 38, a bottom plate 39, two side plates 41 and 42 and two end plates 43 and 44. Support plates 45 and 46 are attached to end plates 43 and 44, respectively, and plate 45 and 46 extend parallel with top plate 38. A pair of ball members 47 and 48 are located in well 35 of deck 36 and are attached to deck 36 by means of bolts 51 and 52, respectively. Support plates 45 and 46 are each provided with a hole 53 that is larger than the outside diameter of the ball members so that plates 45 and 46 can be fitted around ball members 47 and 48, respectively. A pair of pivot plates 54 and 55 are attached on the top and bottom, respectively, of support plate 45 by screws 56 and pivot plates 54 and 55 are provided with a bore that is contoured to fit the spherical shape of ball member 47. Likewise, pivot plates 57 and 58 are attached on the top and bottom, respectively, of support plate 46. It can thus be seen that platform 37 is pivotally positioned in the cutout portion 35 of deck 36 and can flex when the ship's deck is flexed.

The track on the flexible section 31 is formed by plates 61 and 62 that are bolted to top plate 38 of platform 37. Plates 61 and 62 are each provided with a flange 63 and a slot 17 is formed thereby in which the arrester shuttle 16 is slidable. The ends of flanges 63 are provided with a bevel 64 and likewise the ends of the plates forming the permanent track sections are beveled, thereby facilitating the transfer of shuttle 16 between adjoining track sections.

By way of example, the spacing in the well 35 between the deck 36 and the platform 37 might be on the order of three-quarters of an inch to permit sufficient pivoting of platform 37. In order to facilitate the alignment of slot 17 in the flexible section with the slots in the permanent sections, a pair of bumpers 65 are provided on each side of plate 38 near the ends. The spacing between the bumpers 65 and the deck 36 might be on the order of one-thirty second of an inch, however, by way of example, the bumper might be made of a resilient material that will be plyable or compressible whenever the deck flexes a large amount.

It can thus be seen that the present invention provides an improved flexible track section that is to be mounted on an aircraft carrier and which spans on expansion joints on the carrier deck. Obviously many modifications and variations of the present invention are possible in the light of the above teachings. It is therefore to be understood that within the scope of the appended claims, the invention may be practiced otherwise than as specifically described.

What is claimed is:

1. A pivotal track section for spanning an expansion joint on an aircraft carrier deck comprising:
   a platform having parallel top and bottom plates and two end plates,
   first and second support plates attached one each to each said end plate and extending outwardly therefrom parallel with said top plate,
   first and second ball elements stationarily attached to said aircraft carrier deck,
   separate means for pivotally attaching said support plates one each to eah said ball element, and
   track means attached to said top plate for constraining a slidable member.

2. A pivotal track section for spanning an expansion joint on an aircraft carrier as set forth in claim 1 wherein said first and second support plates are each provided with a hole greater in diameter than the diameter of said ball element, and said ball elements extend one each through each hole.

3. A pivotal track section for spanning an expansion joint on an aircraft carrier as set forth in claim 2 wherein separate means for pivotally attaching said support plates one each to each said ball element comprises first and second pivot plates on the top and bottom sides, respectively, of said support plates, said first and second pivot plates each being contour bored to fit said ball, and means for attaching said first pivot plate to said second pivot plate.

4. A pivotal track section for spanning an expansion joint on an aircraft carrier as set forth in claim 3 wherein said platform is positioned in a well in said deck.

References Cited by the Applicant

UNITED STATES PATENTS

| | | |
|---|---|---|
| 922,711 | 5/1909 | Means. |
| 1,553,586 | 9/1925 | Arnstein. |
| 3,079,110 | 2/1963 | Maiorca. |

MILTON BUCHLER, *Primary Examiner.*

P. SAUBERER, *Assistant Examiner.*